T. C. Craven.

Cotton Gin.

No. 1,677. Reissued May 24, 1864.

Witnesses.
Thos. Geo. Harold
Chas. H. Smith.

Inventor.
Thomas C. Craven
per L. F. Shuell
Atty.

UNITED STATES PATENT OFFICE.

THOMAS C. CRAVEN, OF GREENBUSH, NEW YORK.

IMPROVEMENT IN COTTON-GINS.

Specification forming part of Letters Patent No. 41,487, dated January 27, 1864; Reissue No. 1,677, dated May 21, 1864.

*To all whom it may concern:*

Be it known that I, THOMAS C. CRAVEN, of Greenbush, in the county of Rensselaer and State of New York, have invented, made, and applied to use a certain new and useful Improvement in Cotton-Gins; and I do hereby declare the following to be a full, clear, and exact description of my said invention, reference being had to the annexed drawings, making part of this specification, wherein—

Figure 2:
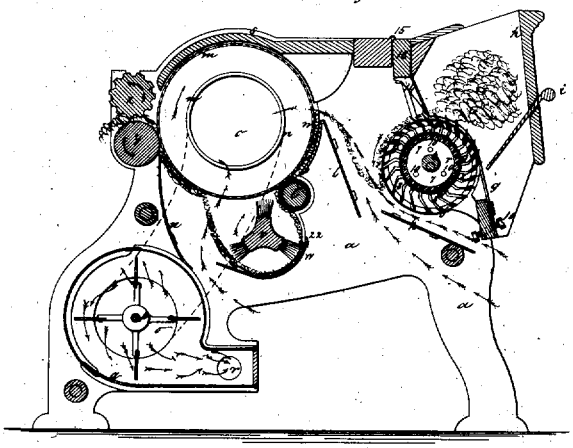
Figure 5:
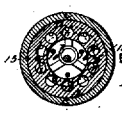
Figure 3:
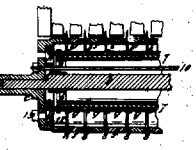
Figure 4:
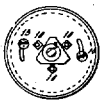
Figure 6:
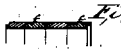
Figure 7:
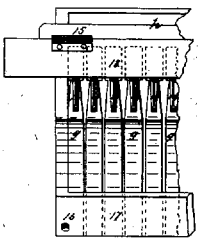
Figure 1:
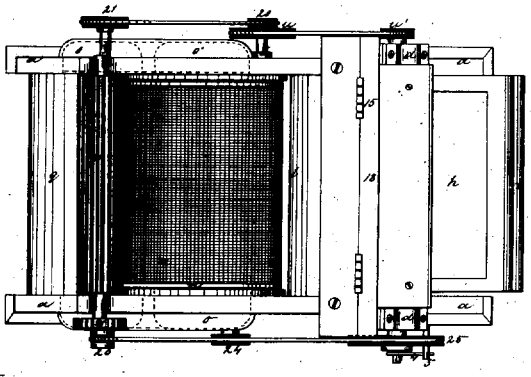

Figure 1 is a plan of my gin. Fig. 2 is a vertical section of the same. Fig. 3 is a longitudinal section of one end of the ginning-cylinder. Fig. 4 is an end view of said cylinder. Fig. 5 is a cross-section of the same at the line *j j* of Fig. 3. Fig. 6 is a portion of the rings composing the cylinder, in section; and Fig. 7 is an elevation of the hopper and guards, between which the teeth of the cylinder pass, as seen from the rear side.

Similar marks of reference denote the same parts.

Efforts have been made to construct cotton-gins with teeth drawing down into the cylinder, in order to allow the cotton to be taken away without injury to the staple.

The nature of my said invention consists in two cylinders—one within and eccentric to the other—revolved in unison by means of gearing of such a character that the revolution of the two cylinders is in no particular dependent on the ginning-teeth; hence strain, wear, and friction on said teeth are avoided.

The teeth themselves are formed of pointed wires secured in a peculiar manner, but allowed to vibrate as the eccentricity of the inner cylinder causes their projection or retraction.

I make use of guards formed of sheet metal, braced at their upper ends, so that the roll of cotton will be easily taken by the teeth of the ginning-cylinder, whereby said teeth do not require to project from the cylinder as much as would be the case if the ordinary cast guards or grates were employed; and the cotton as delivered from the ginning-cylinder is taken by a current of air upon a condensing-cylinder, and from that delivered by a pair of rollers that prevent the escape of any cotton in a state of ignition from the ginning operation.

In the drawings, *a* is the frame, of any suitable material, carrying the shaft *b*, around which the ginning-cylinder revolves. The part 1 of this shaft is larger than the end portion, 2, and eccentric to the same, as seen in Figs. 2, 3, and 5. The heads of the ginning-cylinder are formed with pipe-shaped journals within the boxes *d d* on *a*, the part 2 of the shaft *b* passing through these journals, and terminating at one end in a square, 3, (see Fig. 1,) upon which an arm, 4, is placed, which, resting against or being connected with the stud 5, that projects from the frame *a*, retains the shaft in a given position, in order that the eccentric portion 1 of the shaft may rise above the parts 2, for a purpose hereinafter explained. The arm 4 may be made as a segment of a circle, with a clamping-screw to adjust the shaft, if required.

On the portion 1 of the shaft *b* a cylinder, *e*, is mounted on heads 6, and this cylinder *e* is grooved longitudinally, as shown at 7 7, with as many lines of grooves as there are to be ranges of teeth in the ginning-cylinder. In these grooves are introduced the inner ends of the teeth 8. These teeth are formed of pointed wires bent at an angle similar to card-teeth, as seen in Fig. 2. These teeth are to be connected at their inner ends to the cylinder *e* in such a manner that they can vibrate slightly in the plane of their rotation. I have shown and prefer an L-shaped bend at the inner ends of these teeth, lying in the aforesaid grooves 7, and secured by means of bands 9 9, slipped on successively as the circular ranges of teeth are filled in.

The outer cylinder, *f*, is composed of rings or segments set together, in order the more easily to introduce the teeth 8 8. I have shown rings that are to be set into each other with successive flanges and recesses, as represented in Fig. 6, so that said rings, when set together, will form a perfect cylinder, but yet so constructed that the teeth can be introduced between the respective rings through holes formed by cutting tapering notches in the edges of these rings sufficient for these teeth to pass through, and for allowing the slight vibration and change of angle of the teeth as they are alternately projected and retracted as the cylinders *e* and *f* revolve. The heads *c c* are drawn together, and the rings *f f* bound firmly to each other by tie-rods 10 10.

It will be evident that, the shaft *b* remaining stationary, and the cylinder *e* and *f* revolving on their respective parts thereof, the eccentricity of *e* will cause the teeth 8 to be drawn in on one side and projected on the other; and to avoid friction on these teeth by their binding in the holes in *f* it is necessary that the cylinders *e* and *f* be so connected as to revolve in unison, regardless of their eccentricity. For this purpose I prefer and use pins 11 11, projecting from the end or ends of *e* and passing into circular openings in the disks 12, secured on the inside of the heads *c*. These openings are shown in Fig. 5, and they being of a size corresponding to the amount of motion in the parts resulting from the eccentricity, drawing said pins 11 nearer to the center of *c* at one point than another, said pins are allowed really to slide around against the side of said circular openings as the cylinders revolve, insuring uniformity of rotation, but allowing for the eccentric position of said cylinders. If the center parts of the disks 12 were removed, so that only semicircular scallops were left, the operation would be the same. If the relative position of the cylinders *e* and *f* is changed by setting one of them around farther on its axis, the teeth 8, in consequence of their inclined position, would be projected farther, or retracted, according to which way the change took place. In order, therefore, to compensate for wear on the teeth 8, I attach these disks 12 by screws 13 in slots in *c*. (See Fig. 4.) The parts being at rest, if these screws are slackened and the disks 12 turned partially forward, the cylinder *e*, through the pins 11, will be turned slightly, and the teeth 8 projected farther; or the reverse movement would cause them to be drawn farther into the cylinder *f*. The position of the eccentric portion 1 of the shaft *b* is to be so adjusted by the arm 4 that the teeth 8 project at the part where the cotton is taken from the hopper, and are drawn in at the point where the cotton is delivered from the ginning-cylinder.

The hopper *h* is formed of a suitable size and shape, and is hinged at 15 to the cross-piece of the frame of the machine, so that it can be lifted off the cylinder *f*, and a screw or screws at 16 regulate the position of the hopper and the proximity of the guards *g* to the surface of said cylinder *f*. These guards *g* are formed of sheet metal, and extend from the cross-piece 17 of the hopper to the cross-piece 18, to both of which the respective ends are securely fastened, and the width and location of these sheet-metal guards are such that the teeth 8 project through between them and gin the cotton from the seed, the seed falling away at the opening between the guards and the edge of the adjustable bottom board, *i*, of the hopper *h*. The sheet-metal guards are far preferable to the cast-metal ones heretofore in use, because the teeth 8 do not require to project so far from the surface of the cylinder *f* as would be the case if cast guards were employed. These sheet-metal guards require to be stiffened by braces 14, which I apply at the back of the guards, as seen in Figs. 2 and 7. These braces are connected to the cross-piece 18 and the sheet-metal guards *g*.

It will be seen that the guards *g* can be raised partially off the cylinder *f* by the screws 16; and hence the amount that the teeth project through the guards toward the front part of the cylinder can be regulated, and according to the proximity of the guards to the upper part of the cylinder near the angle of said guards, or the adjustment of the point at which the teeth shall be retracted, by moving the shaft *b* by the arm or segment 4, so the teeth will project more or less at the ginning-point, where the teeth pass through the guards at the angle of the same. I have found that it is best for the teeth to project the most through the guards at the point where the roll of cotton in the hopper comes in contact with said guards, in order that said roll may be revolved, and the cotton on the surface thereof be loosened by the penetration of such teeth, and that the guards be in such a position relatively to the teeth at the angle in said guards that the teeth only project sufficiently to draw the cotton itself through without being liable to injure the seeds, and the teeth passing point first through the guard or grating at the angle or bend, said guards do not tend to lift the cotton off the teeth. It will be evident that this action of the teeth on the cotton is the result of the character of the teeth and peculiar angular form of said guards, and is not dependent upon the use of movable teeth.

*t* is a roller, which I prefer to be of metal with a covering of rubber. This is driven by any suitable gearing or bands. I have shown the pulleys *u* and *u'*, Fig. 1, for this purpose; and *y* is one of the delivery-rollers, driven by suitable means. The pulleys 20 and 21 are shown as designed for this purpose.

*m* is a cylinder formed of wire-gauze, and having ring-shaped heads *n n*. This forms my condensing-cylinder, which lies upon and is supported by these rollers *t* and *y*, and is revolved by their rotation, it having no axial bearings. From the hollow or open ends *n* of this condensing-cylinder trunks *o o* extend to the suction-fan *p*. I have shown and prefer that these trunks be formed in the frame *a*, or attached to it. The said trunks, connecting at the center of the blower, produce a suction into the said condensing-cylinder through the meshes of the wire-gauze in the direction indicated by the red arrows, and the air is blown away out of the blower-case *q* through suitable openings, *r*. The pulleys 25 and 26, with a belt, are represented as the means for driving this blower. A closed cover, *s*, over the condensing-cylinder *m* prevents air passing into the same, except as shown.

The cotton, (shown by blue lines,) as it is dropped by the withdrawal of the teeth 8, is taken by the current of air caused by the suction-fan, that is drawn in between the slide or board *k* and the cylinder *f*, and by the air passing in at the opening 19, and carried up the incline *l* and deposited on the condenser *m*, and said condenser carries the cotton down over the roller *t*, near which point I apply a brush, *v*, that is revolved by the pulley 24, and brushes the cotton off the surface of the condenser *m* and carries it around in the case *w*, and throws it off toward the said condenser *m* again, so that a current of air admitted at the opening 23 carries the cotton up and deposits it again on the condensing-cylinder *m*. The air passing through the cotton in both instances draws out dust and fine impurities, which are taken away by the suction-fan *p*. The action of the brush *v* causes a slight outward current between the end of the case *w* and the roller *t*, to counteract the current of air that would otherwise be drawn in at this point by the blower *p*; and this case *w* is adjustable, so that the edge 22 thereof can be raised or lowered, the object of which is to cause a separation of the motes and small lumps that are found in the ginned cotton. These motes, being small, loose, and heavier than the cotton, will be thrown off by the centrifugal force of the brush over this edge 22, while the cotton travels around in the case *w*. By adjusting the case at this point nothing but motes will be thrown over.

Cotton as it comes from the gin is sometimes on fire from the speed and friction on one piece that may be partially detained. To extinguish this by pressure, while in a loose state, will often prevent accidents. I therefore employ the roller *z*, that is corrugated, in order to take the cotton off the condenser and deliver it between itself and the roller *y*, and the weight of this roller will extinguish any fire by pressure on the loose cotton.

27 are gears connecting the rollers *y* and *z*.

A metal extension-plate between the blower-case *q* and roller *y* excludes air, and completes the construction of the machine.

The operation of this machine as a whole will be apparent from the description given of the action of the respective parts.

I would remark that two or more of the brushes *v* and parts connected therewith might be applied around the condensing-cylinder to loosen the cotton and separate dust and motes, if desired, the said condensing-cylinder being sufficiently large for this purpose.

It will be apparent that any connection between the cylinder *e* and the cylinder *f* that insures their uniform rotation regardless of their relative diameter or eccentricity will relieve the teeth of the friction and strain that would come on them if the teeth were the means of giving rotation from one cylinder to the other; and I would remark that if the disks 12 had V-formed notches instead of circular or semicircular, and the pins 11 were made as tapering teeth taking these V-formed notches, the rotation in unison of the two cylinders would be effected and the ginning-teeth relieved.

The cotton is by this machine ginned from the seed without injury to the fiber, and cleaned from dust and motes and delivered in a bat, ready to be packed or used in carding-machines.

I am aware that sheet-metal guards have been employed in cotton-gins, and that such guards have extended across the hopper, and that the saw-gin teeth have passed point first through the guard, so as to prevent the cotton escaping or being lifted off the tooth. In all such instances the teeth have had a fixed and determined length of projection from the plate on which they are formed, and the guards, being below the base of the teeth, allowed the ginning-saws to cut into and often break up the roll of cotton in the hopper, so that it would not revolve. In my invention only the parts of the ginning-teeth themselves that project above the guards enter the roll, and this is regulated by the adjustment of the hopper and guards; hence the roll in the hopper is not liable to be broken up by the teeth, the gin has less friction on it, and the fiber is not injured in the ginning operation.

What I claim, and desire to secure by Letters Patent, is—

1. A series of teeth connected at one end to a cylinder within and eccentric to an outer cylinder, so that said teeth will be alternately projected and retracted in the revolution of such cylinder, when said cylinders are connected together substantially as described, so that they revolve in unison upon a non-revolving shaft without strain or friction on the teeth, as and for the purpose set forth.

2. The plates 12, constructed and adjusted as specified, in combination with the cylinders *e* and *f* and teeth 8, whereby the teeth can be adjusted and projected more or less, as specified.

3. Constructing the teeth of the cotton-ginning cylinder of pointed wires having L-shaped bends, by means of which they are secured to the cylinder *e* by bands 9, as set forth.

4. Rotating the cylinder *f* in unison with the cylinder *e* by means of the pins 11, entering into the openings in the plates 12 at the end of the cylinder *f*, as specified.

5. Regulating or determining the operative length of the ginning-teeth by means of metallic guards between such teeth, having their supporting-surfaces above the base of the teeth, so that only those portions of the teeth that are above said guard operate on the roll of cotton, as specified.

6. A sharp angle or bend formed in the aforesaid metallic guards at the point where the teeth draw the cotton through the guards, in combination with tapering rounded teeth projecting up between such guards, and having their base below the surfaces of such guards, whereby the action of the teeth at the point where the seeds are separated from the cotton is not injuriously affected by the surfaces of the guards being above the base of the teeth, as specified.

7. Conveying the cotton from the ginning-cylinder up the incline *l* to the condensing-cylinder by a current of air induced by the suction-blower *o*, entering the opening 19, as specified.

8. The arrangement of the roller *t*, brush *v*, and adjustable guard *w*, whereby the action of said brush in separating the motes can be regulated, as specified.

9. The condensing-cylinder *m*, supported and driven by the rollers *t* and *y*, as specified, whereby the said condensing-cylinder can be formed without any central axis, and with its ends open for the air to be exhausted, as specified.

10. The exhausted condensing-cylinder *m*, fitted and acting as specified, in combination with the rollers *y* and *z*, for removing the cotton from such cylinder, as specified.

In witness whereof I have hereunto set my signature this 9th day of March, A. D. 1864.

THOS. C. CRAVEN.

Witnesses:
LEMUEL W. SERRELL,
CHAS. H. SMITH.